(12) United States Patent
Eriksen

(10) Patent No.: US 8,574,417 B2
(45) Date of Patent: Nov. 5, 2013

(54) METHOD FOR TWO-STEP SEPARATION OF WATER, SALT AND PARTICLES FROM A HYDRAULIC FLUID

(75) Inventor: Egil Eriksen, Foldrøyhamn (NO)

(73) Assignee: Tool-Tech AS, Rykkinn (NO)

( * ) Notice: Subject to any disclaimer, the term of this patent is extended or adjusted under 35 U.S.C. 154(b) by 139 days.

(21) Appl. No.: 13/060,432

(22) PCT Filed: Aug. 7, 2009

(86) PCT No.: PCT/NO2009/000275
§ 371 (c)(1),
(2), (4) Date: May 20, 2011

(87) PCT Pub. No.: WO2010/024682
PCT Pub. Date: Mar. 4, 2010

(65) Prior Publication Data
US 2011/0210003 A1   Sep. 1, 2011

(30) Foreign Application Priority Data
Aug. 25, 2008  (NO) .................................. 20083650

(51) Int. Cl.
*B01D 17/06*    (2006.01)
*B01D 39/04*    (2006.01)
*C10G 33/02*    (2006.01)

(52) U.S. Cl.
USPC ........... 204/555; 204/563; 204/565; 204/662; 204/666; 210/254; 210/669; 210/689

(58) Field of Classification Search
USPC .................. 204/555, 563, 564, 565
See application file for complete search history.

(56) References Cited

U.S. PATENT DOCUMENTS

| 4,019,977 | A | * | 4/1977 | Hachadoorian et al. | 208/188 |
|---|---|---|---|---|---|
| 4,257,895 | A | | 3/1981 | Murdock | |
| 4,302,335 | A | * | 11/1981 | Habermas | 210/651 |
| 5,958,205 | A | * | 9/1999 | Ingalls et al. | 204/664 |
| 6,391,268 | B1 | | 5/2002 | Berry et al. | |
| 7,556,739 | B1 | * | 7/2009 | Johnston-Dhuet et al. | 210/664 |
| 2003/0145991 | A1 | * | 8/2003 | Olsen | 166/265 |
| 2003/0153468 | A1 | | 8/2003 | Soelvik | |
| 2004/0099606 | A1 | | 5/2004 | McGarvey et al. | |
| 2006/0278584 | A1 | * | 12/2006 | Bowden et al. | 210/739 |
| 2008/0116072 | A1 | * | 5/2008 | Liverud et al. | 204/563 |

FOREIGN PATENT DOCUMENTS

JP    63143907 A    6/1988

OTHER PUBLICATIONS

International Search Report for Interantional Patent Application No. PCT/NO2009/000275, dated Nov. 18, 2009.

* cited by examiner

*Primary Examiner* — Patrick Ryan
*Assistant Examiner* — William Leader
(74) *Attorney, Agent, or Firm* — Patterson & Sheridan, L.L.P.

(57) ABSTRACT

The invention relates to a method for two-step separation of water, salt and particles from a hydraulic fluid by the use of a control unit. The hydraulic fluid is carried into a return oil tank with an electrostatic coalescer provided with a high-voltage transformer with direct current to two electric grids whose electrostatic field gathers water into drops which settle into a collecting tank. The hydraulic fluid is circulated to a filter module for removing any remaining water, salt and particles in filter elements connected in parallel, having hygroscopic cellulose fibers which swell until saturation, the swelling being measured by a sensor measuring the degree of saturation, alternatively conductivity.

2 Claims, 1 Drawing Sheet

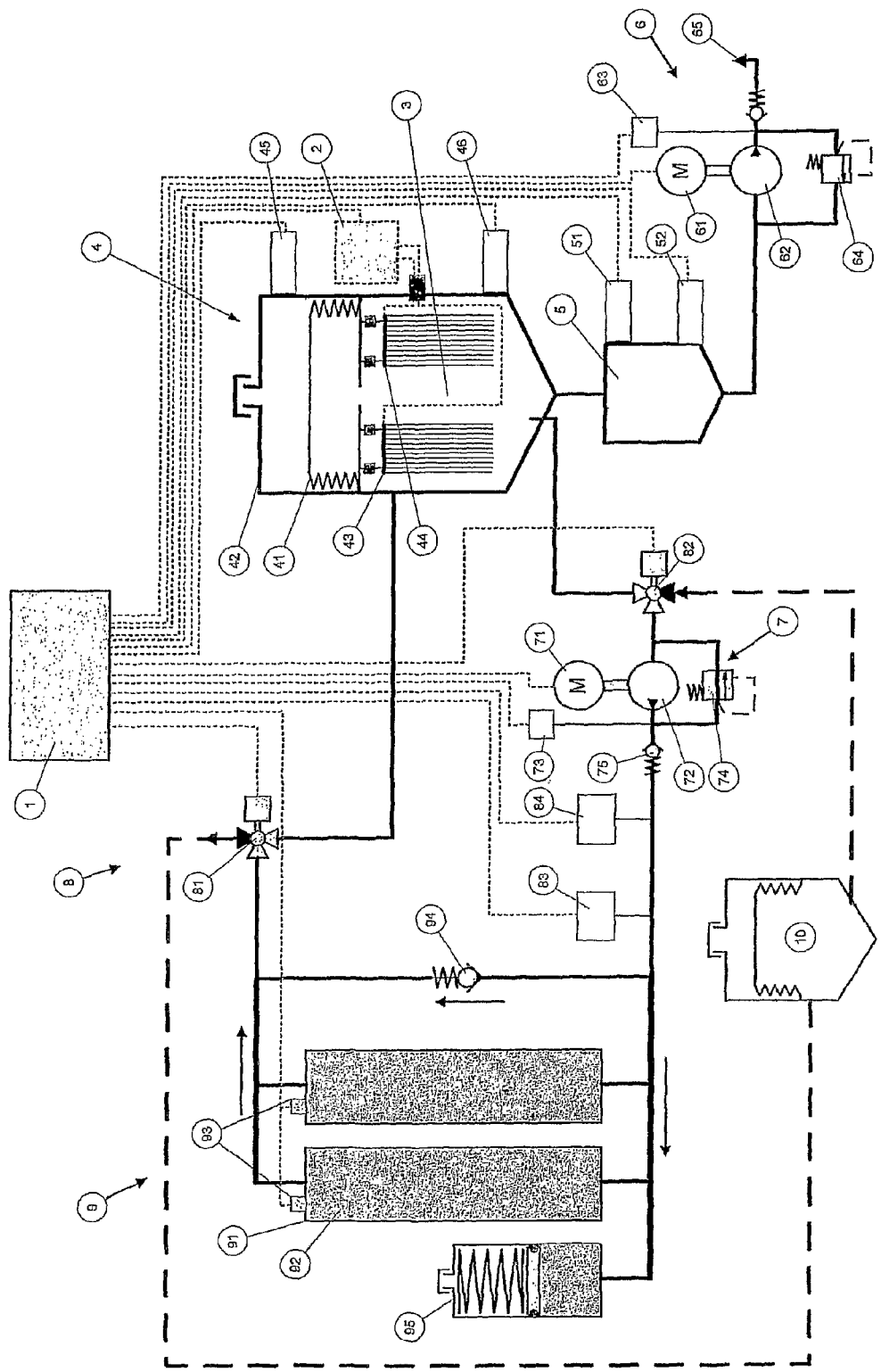

METHOD FOR TWO-STEP SEPARATION OF WATER, SALT AND PARTICLES FROM A HYDRAULIC FLUID

The invention relates to a method for two-step separation of water, salt and particles from a hydraulic fluid as it is specified in the accompanying claim 1.

There is an essential difference between separation of produced water from crude oil as part of a production process and separation of relatively small amounts of water from hydraulic oil with extreme requirements for dryness and purity.

It is a common problem that water enters the control lines of the hydraulic umbilicals which are used to control underwater equipment from a surface installation. After every well completion operation, large amounts of hydraulic fluid are dumped into tanks on board the surface installation because of water ingress in the control lines. Typically, 2,000-3,000 liters of hydraulic fluid are dumped in the course of one well completion campaign on the Ormen Lange for 3-4 wells. The hydraulic fluid is sent ashore for destruction or possible recovery.

For an application with a subsea hydraulic power unit (HPU) there is a corresponding problem of water ingress when subsea tooling systems are being connected or possibly by leakages in subsea hydraulic systems.

The prior art for removing water from a hydraulic fluid is centrifugation and water separation via units working with heat and vacuum, but the methods are not applicable in a sub-sea implementation.

There is known a principle of an electrostatic field for separating water from crude oil, but not for a hydraulic fluid.

The coalescer which will be described below works by electro-static influence on hydraulic fluid for the separation of free water and is included together with a cellulose filter in a two-step system solution for removing any remaining water content from the hydraulic fluid.

From the patent literature are cited as the background art:
US 2003/0153468, U.S. Pat. No. 4,257,895 and U.S. Pat. No. 6,391,268 disclose water separation from crude oil by electrostatic influence on the fluid. The demands regarding purity, application and implementation made of methods for separating water from hydraulic fluid are completely different from those of water separation methods in the production of crude oil.

JP 63143907 discloses a water absorption element installed in a tank. The element contains a particular gel which changes between being water-absorbent and water-repellent, depending on the temperature. The element is removed at regular intervals and heated to remove absorbed water, after which it is reinstalled in the tank and reused.

US 2004099606 discloses a method and an apparatus removing water from an emulsified oil by the water/oil emulsion passing through a container/column filled with grains/granules consisting of a superabsorbent polymer. A typical application is the cleaning of used motor oil. This may be a larger process with several columns, possibly combined with heating before the emulsion passes the granules. Saturated granules are waste from the process and are replaced, possibly as an automated process.

The invention has for its object to remedy or reduce at least one of the drawbacks of the prior art.

The object is achieved through features which are specified in the description below and in the claims that follow.

The present application relates to a method for two-step separation of water, salt and particles from a hydraulic fluid, and the method is characterized by the characteristics set forth in the claims that follow.

The removal of water, salt and particles from a subsea hydraulic fluid takes place in two different areas of application:
- a separator solution included in a subsea hydraulic power unit, HPU, which is permanently installed on a subsea installation, and
- a mobile treatment unit for removing water, salt and particles from hydraulic fluid, in which the equipment is placed on board a vessel for subsea operations or used on land.

The method is based on the separation of free water from the hydraulic fluid before the remaining content is absorbed in a filter step, which increases the fluid treatment capacity and gives better operating economy.

By the method of the application, with the fast fluid treatment, there is time to prepare used hydraulic fluid for reuse between the well operations. Thereby, the dumping of hydraulic fluid worth NOK 250,000-300,000 for a well completion campaign of 3-4 wells is avoided, and savings are achieved in connection with purchase, logistics and transport in the acquisition, and in the removal of used hydraulic fluid.

In what follows is described an example of a preferred embodiment which is visualized in the accompanying drawing:

FIG. 1 showing a sectional side view of a cleaning plant in a subsea variant.

The principle of a cleaning plant according to the invention is the same whether the equipment is placed under water or on the surface. Used in surface operations, this means that pressure compensators are not used, and free water is drained directly from a tank for separated water after the connection between said tank and other tanks connected to it have been shut off by a valve.

In the figure, the reference numeral 1 indicates a control unit which includes communication equipment to the surface for a subsea application.

A high-voltage transformer 2 is included in an electrostatic coalescer 3. The transformer 2 is connected to two electric grids 43, 44 in a return oil tank 4 with a compensator bellows 41 for subsea pressure compensation, a tank body 42 with an opening towards sea water pressure outside the pressure compensator 41. One electrically charged grid 43 exhibits A-polarity and the other charged grid 44 exhibits B-polarity. A first level transmitter 45 indicates a high oil level, and a second level transmitter 46 indicates a low oil level.

A collecting tank 5 for separated water is provided with a first level switch 51 for the indication of a high water level and a second level switch 42 for the indication of a low water level.

A pumping section 6 for separated water is provided with an electric frequency-controlled motor 61, an injection pump 62, a pressure transmitter 63, a safety valve 64 and a connecting point 65 with a check valve connected to a conduit (not shown) for dumping free water. In a subsea application, with a pressure-compensated reservoir as shown in FIG. 1, the collecting tank 5 is connected to the return oil tank 4. In a surface application with an atmospheric, vented reservoir, the connection to the return oil tank 4 is closed and the free water is drained into a storage container (not shown).

A pumping section 7 for the circulation of oil is provided with an electric frequency-controlled motor 71, a circulation pump 72, a pressure transmitter 73, a safety valve 74 and a check valve 75 on the output from the pump 72.

A circulation circuit 8 is provided with first and second remote-operated three-way valves 81, 82 to control the circulation and transfer of oil between the return oil tank 4 and a supply tank 10 in a subsea HPU.

The second three-way valve 82 is arranged upstream of the circulation pump 72. This normally sucks from the return oil tank 4 but may be connected to the supply tank 10 if it is desirable to circulate the contents of this to filtration. The first three-way valve 81 is arranged downstream of the circulation pump 72 and directs the oil flow to the supply tank 10 or return oil tank 4. Finally, the circulation circuit 8 has a water sensor 83 for measuring the water content of the hydraulic oil and a particle counter 84 for measuring the particulate content of the hydraulic oil.

A filter module 9 for removing any remaining content of water, salt and particles is provided with a filter housing 91 with internal cellulose filter elements 92, a sensor 93 for measuring the water saturation of the filter, a bypass line 94 with a check valve which opens at too high a differential pressure across the filter 92, and a pressure compensator 95 for the filter housing 91.

The separation takes place in a low-pressure system for hydraulic fluid in a subsea application or in a separate oil treatment system with aqueous hydraulic fluid replenishment in a surface application.

When the system is operated by means of the control unit 1, which includes communication equipment to the surface for a subsea application, the hydraulic fluid is first carried into the return oil tank 4 with the electrostatic coalescer 3, and the high-voltage transformer 2 is connected. In a subsea application the return oil tank 4 is pressure-compensated by the compensator bellows 41 against the surrounding sea water pressure. The tank body 42 is provided with an opening towards the sea water pressure on the outside of the built-in pressure compensator 41 of the return oil tank 4.

The electrostatic coalescer 3 works at a relatively high DC voltage in the range up to 30,000 VDC and consists of the two electric grids 43, 44 which are mounted inside the return oil tank 4. The oil/water emulsion is exposed to an electrostatic field, and the water droplets in the emulsion coalesce into larger droplets which are separated as free water and settle into the collecting tank 5 below the return oil tank 4 because of the higher density of the water compared with the hydraulic oil.

The electrostatic field changes polarity, and ongoing tests will clarify what voltage and frequency provide the optimal coalescence.

The level instrumentation of the collecting tank 5 detects when the collecting tank 5 has been filled with free water. In a subsea application, the free water is drained into a suitable storage container (not shown) or a pipeline (not shown) on the installation. The injection pump 62 is without a dynamic seal between the frequency-controlled motor 61 and the pump 62. On the outlet of the injection pump 62 is installed a check valve and a safety valve 64.

In a corresponding system for use on the surface, the connection between the collecting tank 5 for water and the return oil tank 4 with the electrostatic coalescer 3 is closed, the free water is drained from the collecting tank 5 and filled into a storage tank or oil drum.

When free water has been separated and removed, the hydraulic oil is circulated into the circulation circuit 8 of the filter module 9 for any remaining water, salt and particles to be removed.

The filter module 9 is established from the filter elements 92 in the filter housings 91, connected in parallel, the filters being provided through hygroscopic cellulose fibres which swell until saturation.

A standard filter element 92 absorbs up to three liters of free water. The swelling is measured by the sensor 93 which measures the degree of saturation. Alternatively, the conductivity of the filter element 92 is measured in order to measure the water absorption/degree of saturation.

The bypass line installed, with the check valve 94, opens if the differential pressure across the filter element 92 exceeds 3 bars.

In a subsea version of the equipment, the filter housings 91 connected in parallel will be connected to the pressure compensator 95 which balances the internal pressure against the sea water pressure on the outside.

The invention claimed is:

1. A method for two-step separation of water, salt and particles from a hydraulic fluid in a subsea application, wherein the hydraulic fluid is carried into a return oil tank with an electrostatic coalescer and a connected high-voltage transformer, the return oil tank is pressure-compensated by a pressure compensator bellows against surrounding sea water pressure, and a body of the return oil tank is provided with an opening towards the pressure on the outside of the pressure compensator bellows of the return oil tank, the electrostatic coalescer is supplied with a DC voltage of up to 30,000 VDC with changing polarity on two electric grids which are mounted internally in the return oil tank, and the hydraulic fluid is exposed to an electrostatic field, so that water droplets in the hydraulic fluid coalesce into larger droplets which are separated as free water and settle into a collecting tank below the return oil tank, a level instrumentation arranged in the collecting tank detects when the collecting tank has been filled, when free water has been separated and removed from the hydraulic fluid, the hydraulic fluid is circulated via a circulation circuit to a filter module for any remaining water, salt and particles to be removed, and the filter module is established from several filter elements in filter housings, connected in parallel, with hygroscopic cellulose fibres which swell until saturation, and the swelling is measured by sensors measuring the degree of saturation, or alternatively instrumentation measuring conductivity.

2. The method according to claim 1, wherein a bypass line with a check valve bypassing the filter module opens if the differential pressure over the filter module exceeds three bars.

* * * * *